United States Patent [19]

Furuya et al.

[11] Patent Number: 5,153,829
[45] Date of Patent: Oct. 6, 1992

[54] MULTIFUNCTION MUSICAL INFORMATION PROCESSING APPARATUS

[75] Inventors: Yoji Furuya, Inagi; Kenichiro Sugiura, Funabashi; Toshio Sugino; Hideyuki Kobayashi, both of Tokyo; Michihei Murayama, Tachikawa; Shigehiro Kadota, Kawasaki; Hiroo Teraichi, Fujisawa; Mutsumi Miyata, Tokyo, all of Japan

[73] Assignee: Canon Kabushiki Kaisha, Tokyo, Japan

[21] Appl. No.: 690,328

[22] Filed: Apr. 26, 1991

Related U.S. Application Data

[63] Continuation of Ser. No. 268,864, Nov. 8, 1988, abandoned.

[51] Int. Cl.⁵ .......................... G09B 15/04; G10H 1/00
[52] U.S. Cl. ..................... 364/419; 84/622; 84/477 R; 84/DIG. 12; 84/254
[58] Field of Search ......... 364/419; 84/470 R, 472 R, 84/254, DIG. 12, 1.01; 340/712

[56] References Cited

U.S. PATENT DOCUMENTS

| | | | |
|---|---|---|---|
| 3,577,824 | 5/1971 | Lavan | 84/470 R |
| 4,089,246 | 5/1978 | Kooker | 84/470 R |
| 4,399,731 | 8/1983 | Aoki | 84/470 R |
| 4,474,098 | 10/1984 | Pepersack et al. | 84/470 R |
| 4,646,609 | 3/1987 | Teruo et al. | 84/1.01 |
| 4,725,694 | 2/1988 | Auer et al. | 340/712 |
| 4,748,885 | 6/1988 | Sato | 84/1.03 |

OTHER PUBLICATIONS

"Commodore's Music Cartridges", Sharon Aker, Softside, vol. 7, No. 2, p. 6812.

Primary Examiner—Gail O. Hayes
Attorney, Agent, or Firm—Fitzpatrick, Cella, Harper & Scinto

[57] ABSTRACT

An information processing apparatus includes: a unit for displaying on a screen a musical score, keyboard and tone time information to be inputted; a unit for designating the position of the keyboard, and tone time information, respectively displayed on the display unit; a unit for storing musical information produced through designation by the designating unit of the position of the keyboard and tone time information displayed on the display unit; a unit for controlling the display of the musical score, keyboard and tone time information on the screen of the display unit, and for controlling the display of a pattern of musical tone or rest on the musical score on the display unit in accordance with the position of the keyboard and tone time information respectively designated by the designating unit; and a unit for generating a musical tone by reading the musical information stored in the storage unit.

16 Claims, 10 Drawing Sheets

MULTIFUNCTION MUSICAL INFORMATION PROCESSING APPARATUS

This application is a continuation of application Ser. No. 07/268,864 filed Nov. 8, 1988, now abandoned.

BACKGROUND OF THE INVENTION

1. Field of the Invention

The present invention relates to a multifunctional information processing apparatus, and more particularly to an information processing apparatus capable of producing musical information by using a music editing function, and utilizing the musical information while performing other functions of the apparatus.

2. Related Background Art

A telephone set for example generally has an automatic answering function. Telephone messages, musical information, or the like to be used for such an automatic answering function are previously recorded in a cassette type magnetic tape mounted on an automatic answering telephone set. A musical instrument is also commercially available which composes musical information using a keyboard, memorizes it, and reproduces it with a desired tone color.

However, an apparatus is not known which has all the above functions, namely, the functions for a telephone set and a musical instrument. It is necessary for a conventional automatic answering telephone set to previously record musical information in a cassette type magnetic tape in order to use it for such purpose, resulting in a burden on a user.

SUMMARY OF THE INVENTION

It is a first object of the present invention to provide an information processing apparatus which can selectively execute one of a plurality of independent functions including a music editing function, and can use music information produced by the music editing function for other functions of such are performed by a telephone set or the like.

It is a second object of the present invention to provide a multifunctional information processing apparatus capable of displaying desired musical notes, rests and the like on a score displayed on a display device, and storing and outputting the produced musical information as desired It is a third object of the present invention to provide a multifunctional information processing apparatus capable of displaying desired musical notes, rests and the like on a score displayed on a display device, and playing the produced musical information with a plurality of musical instruments.

It is a fourth object of the present invention to provide an information processing apparatus capable of forming a desired musical note while observing a display on a display device, and deleting, modifying, and printing out a part of the produced musical note.

DETAILED DESCRIPTION OF THE EMBODIMENT

A preferred embodiment of this invention will be described in detail with reference to the accompanying drawings.

Figure 1:
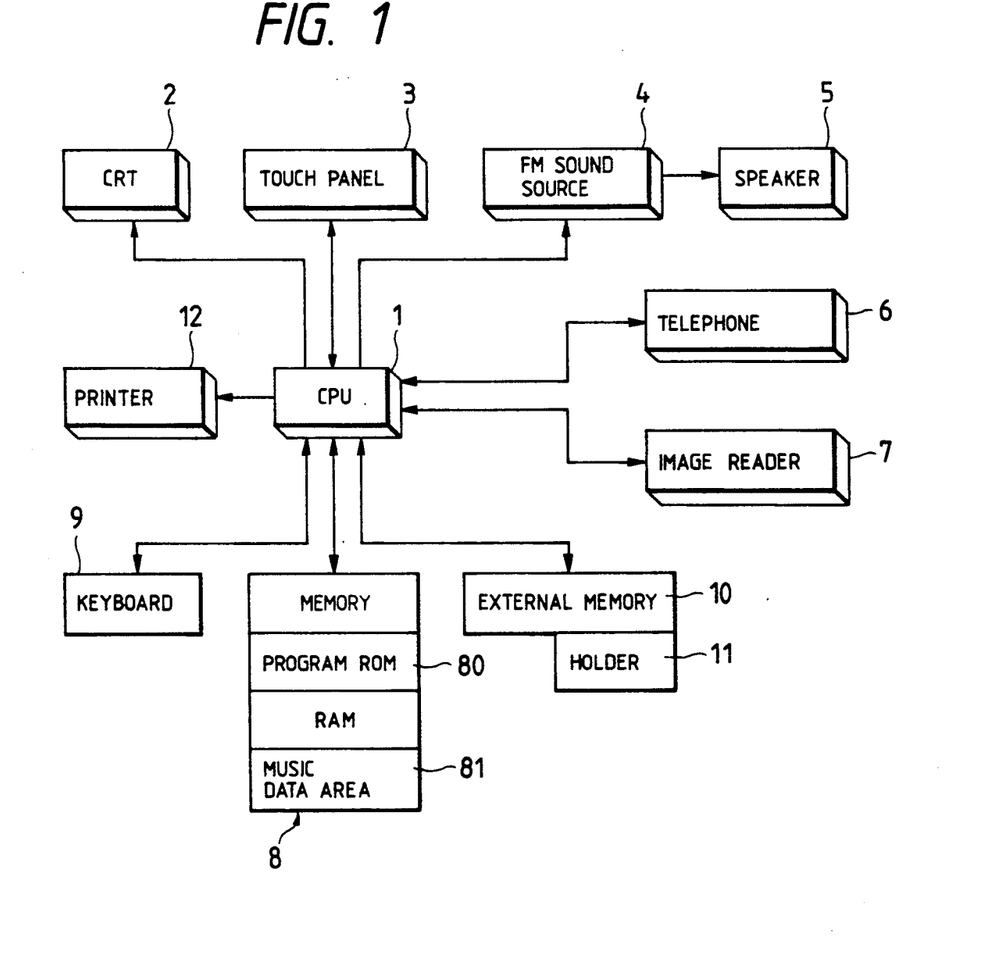
FIG. 1 is a block diagram showing the structural outline of an embodiment of the information processing apparatus of this invention.

Description of Apparatus (FIG. 1)

FIG. 1 is a block diagram showing the structural outline of an embodiment of the information processing apparatus.

A control unit 1 for controlling the entirety of the apparatus has a CPU such as microprocessor and various I/0 ports, and outputs and inputs control and data signals to and from necessary circuit elements. A CRT display unit 2 displays on the screen thereof, various menus, document information, image data read with an image reader 7, or the like. A transparent, pressure-sensitive touch panel 3 mounted on CRT 2 is used to input items, coordinates or the like by pressing the surface thereof with a finger or the like.

A frequency modulation (FM) music source 4 having various tone colors of musical instruments reads musical information produced by a music editor (to be described later) and stored in a memory 8 or an external memory 10, and frequency modulates the musical information. Electric signals from the FM music source 4 are transformed into audible sounds by a loudspeaker 5.

A telephone unit 6 has various telephone functions such as an ordinary telephone function, automatic answering function and the like. An image reader 7 optically reads various originals such as facsimile documents and the like and supplies the read-out data to the apparatus. A memory 8 is constructed of a program ROM 80, another ROM area, and a RAM area, the program ROM 80 storing a system program, a manager program and other application programs, the other ROM area storing character fonts, a dictionary and the like, and the RAM area storing application programs, document information and musical information loaded from the external memory 10. The RAM area also includes a video RAM storing display data for CRT 2, and the like.

A keyboard 9 is used to input to the apparatus, document information, various commands and the like. On this keyboard 9, a joystick and the like for indicating the position on the screen of CRT 2 are mounted. The external memory 10 such as a micro floppy, hard disc or the like stores a holder 11 which stores document information, musical information, user application programs, and the like. Reference numeral 12 denotes a printer.

Figure 2:
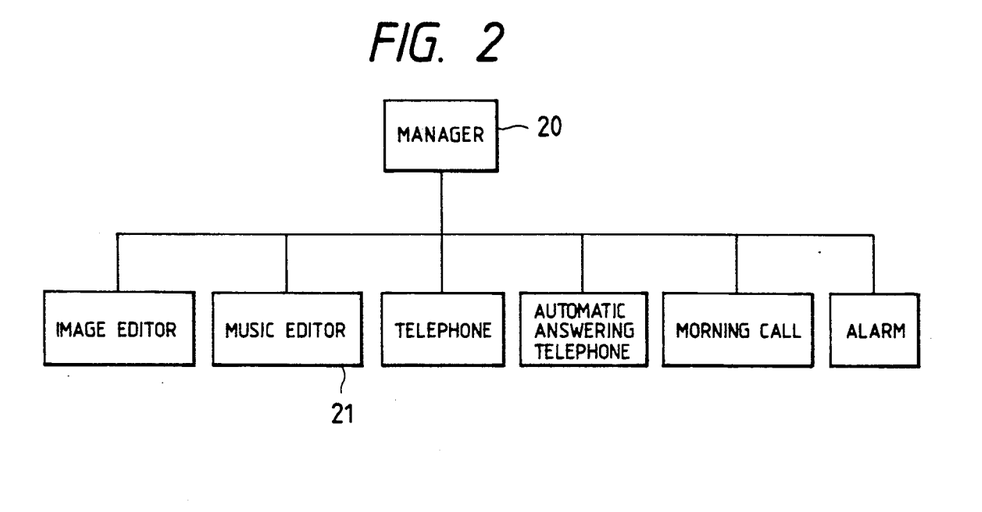
FIG. 2 shows the functions of an embodiment of the present invention.

Description of Program Architecture (FIG. 2)

FIG. 2 shows the relationship between a managing program (hereinafter called as a manager 20) and various other functional programs for the embodiment apparatus managed or supervised by the manager 20.

The manager 20 is a task management program by which a plurality of functional programs (tasks) shown in FIG. 2 are selectively executed.

Upon turning on the power of the apparatus, icons for the program stored in the program ROM 80 are displayed as a main menu on the screen of CRT 2. When an operator touches an icon, a corresponding program will start. The icons are used to designate various environment settings including setting of a telephone number, printing density, key repeat time for the keyboard 9, sound volume of the loudspeaker 5, and the like.

The telephone function can be designated through the touch panel while the main menu is displayed, or it automatically starts upon reception of a call, or upon picking up the handset of the telephone unit. The telephone function has a function of setting a telephone holding melody which may be musical information produced by the music editor 21 to be described later.

The telephone function also has a morning call function which is performed by previously recording a morning call message into the memory through the handset, and setting the day, time, telephone number of a destination, and the like. The morning call function can use the musical information produced by the music editor 21 as a morning call music.

An alarm function is used to output at a designated time a background music, picture and the like. The picture information to be used is produced beforehand with the image editor function and block-picked up for storage into the data area for the alarm function, whereas the musical information is produced beforehand with the music editor 21 and block-picked up for storage into the data area for the alarm function.

Figure 3:
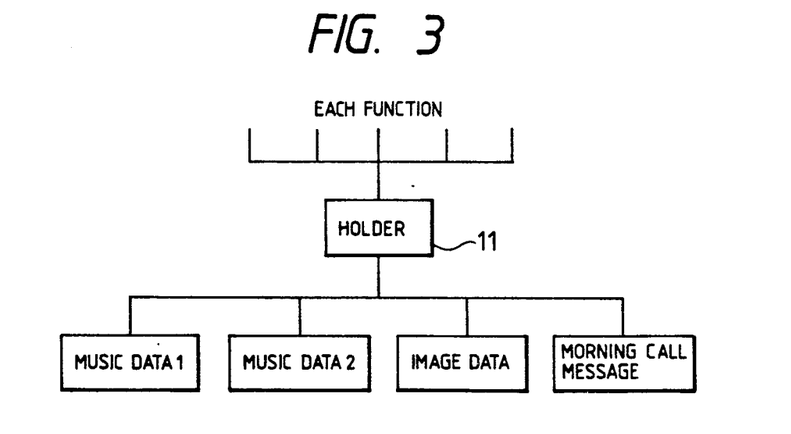
FIG. 3 shows the relationship between a holder and the other functions.

Description of Holder (FIG. 3)

FIG. 3 shows the relationship between the holder 11 and the other programs.

The holder 11 is accessible by each of the plurality of functions and includes a plurality of sheets. Each sheet includes various data such as music data produced with the music editor 21, image data produced with the image editor function, morning call messages, telephone number directories, and the like.

Description of Music Editor Function (FIGS. 4 to 8)

Figure 4:
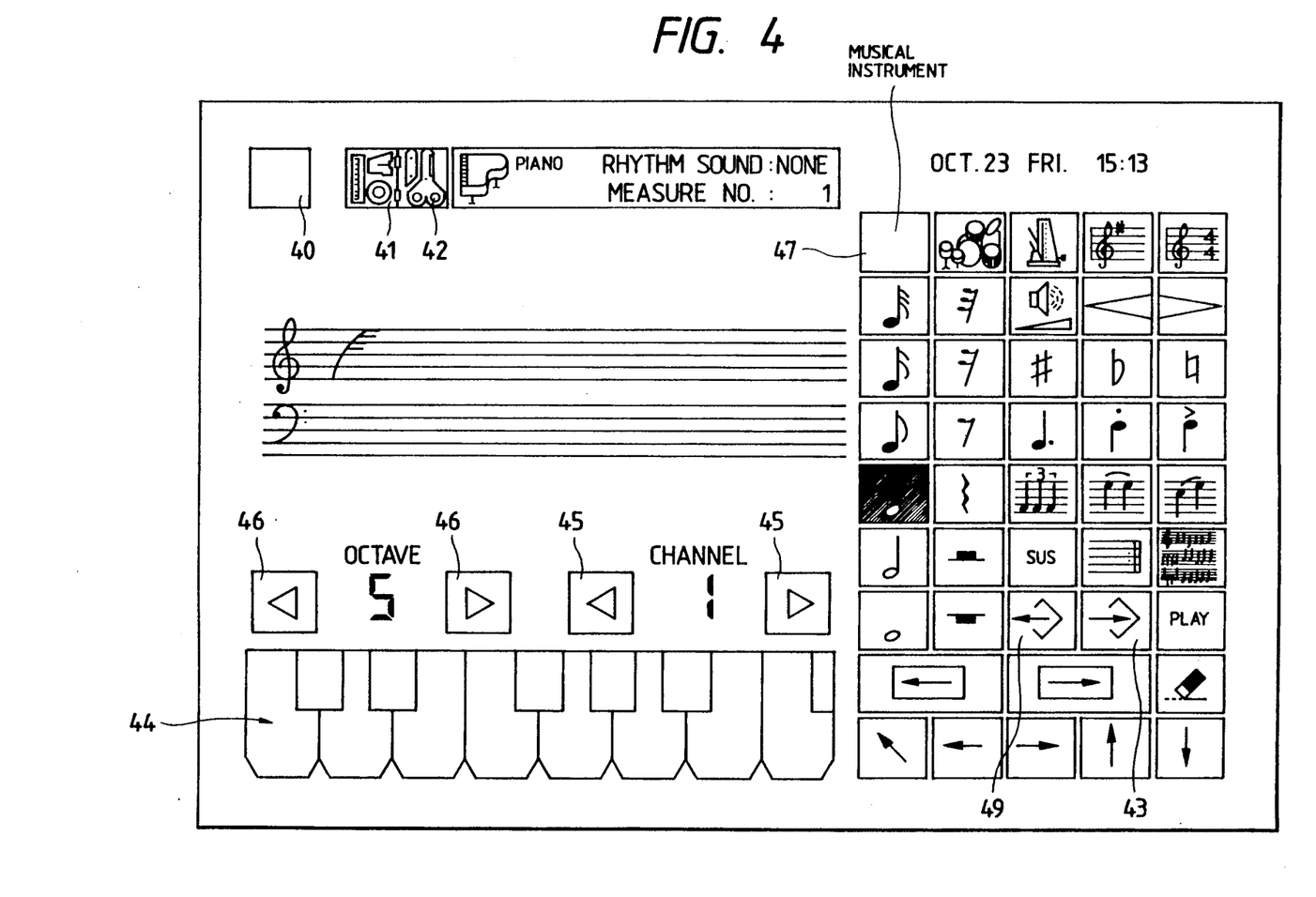
FIG. 4 shows an example of a start display of the music editor.

FIG. 4 shows a start display of the music editor function of this embodiment.

This functional program is ordinarily stored in a floppy disk or the like of the external memory 10. The program stored by a user in a vacant area in the memory 8 starts upon designation of a music editor icon on the main menu through the touch panel 3.

Reference numeral 40 represents a screen change portion for scrolling up the screen by one frame. Thus, by touching this portion through the touch panel 3, the display returns back to the main menu.

Reference numerals 41 and 42 represent a portion for designating a tool box function to be described later. Portion 41 is used for designating an attachment or copy of data, and portion 42 is used for designating a block-pick-up of data. Reference numeral 44 represents a keyboard portion which is touched to produce musical information. Reference numeral 45 represents a channel indication portion for designating a music play channel. The channel number is incremented by 1 upon depression of the right side arrow portion, whereas it is decremented by 1 upon depression of the left side arrow portion.

Reference numeral 46 represents an octave portion for designating the octave of a note to be inputted. Similar to the channel designation, the octave is incremented by 1 upon depression of the right side arrow portion, whereas it is decremented by 1 upon depression of the left side arrow portion. Reference numeral 47 represents a musical instrument type portion for designating a musical instrument used in a particular channel. Upon depression of the musical instrument type portion 47, a musical instrument selection display is given on the screen.

As the keyboard 44 is touched, a musical note designated by an icon at the right side of FIG. 4 is displayed on the score at the designated octave area, and scrolled after a predetermined number of musical notes have been displayed. Using the icons at the right side of FIG. 4, not only the musical notes but also rests, decrescendos, slurs, and the like may be used in composing music.

After completion of composing music (producing musical information), a storage icon 43 is touched. Then, the holder 11 of the external memory 10 is accessed to store the musical information in a data sheet designated by the user. The stored musical information can be printed out with the printer 12 to form a musical score.

The tool box function starts when an icon 42 is touched. A part of the musical information produced with the music editor can be designated and block-picked up with the tool box function. The block-picked-up musical information may be used for other function such as the telephone function.

Figure 5:
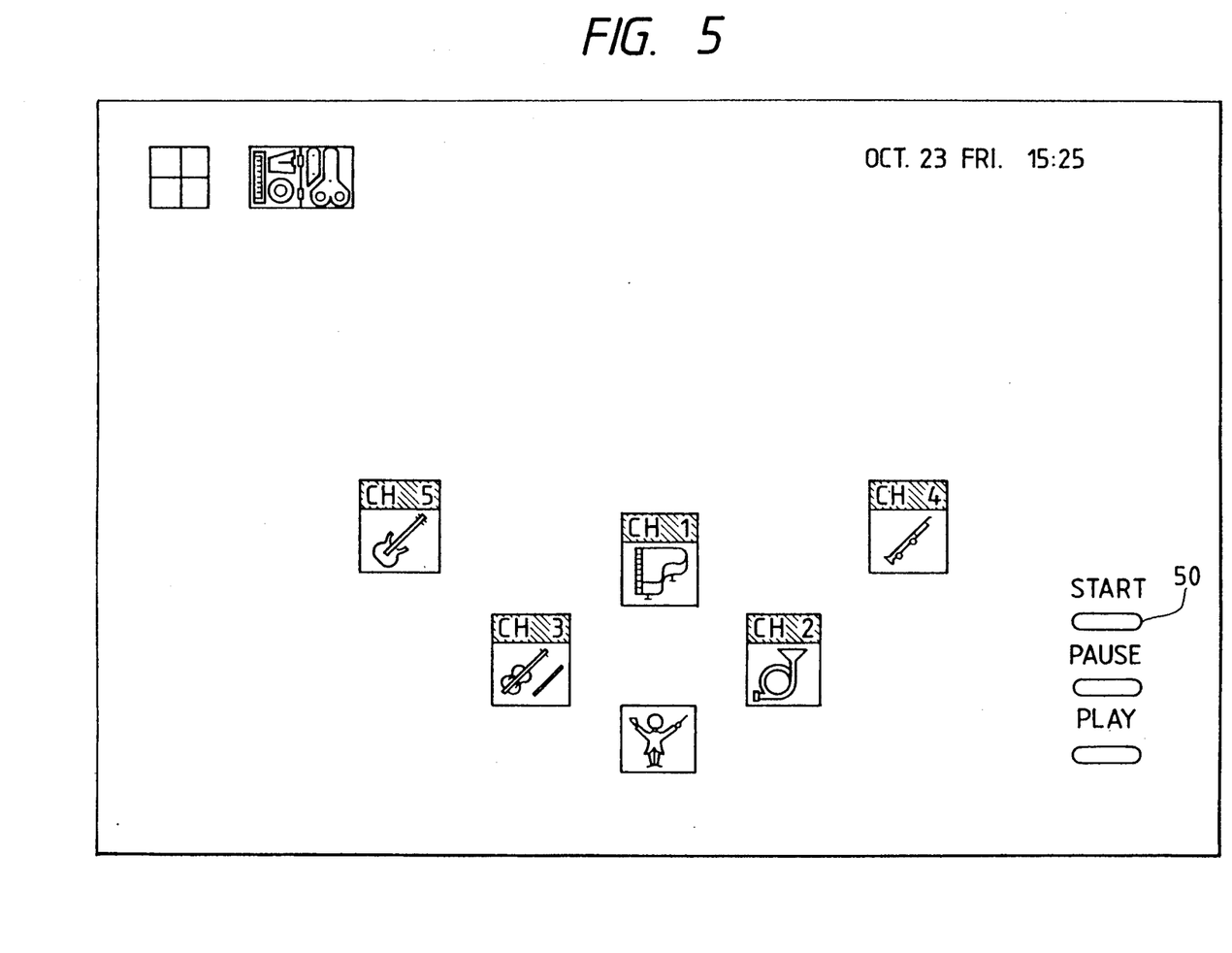
FIG. 5 shows an example of a display before playing music produced by the music editor.

FIG. 5 shows a display before playing music when a play icon shown in FIG. 4 is touched.

Each channel is assigned with the particular musical instrument, e.g., piano for channel 1, horn for channel 2, violin for channel 3, oboe for channel 4, and guitar for channel 5. The musical instruments can be used all at one time.

Figure 6:
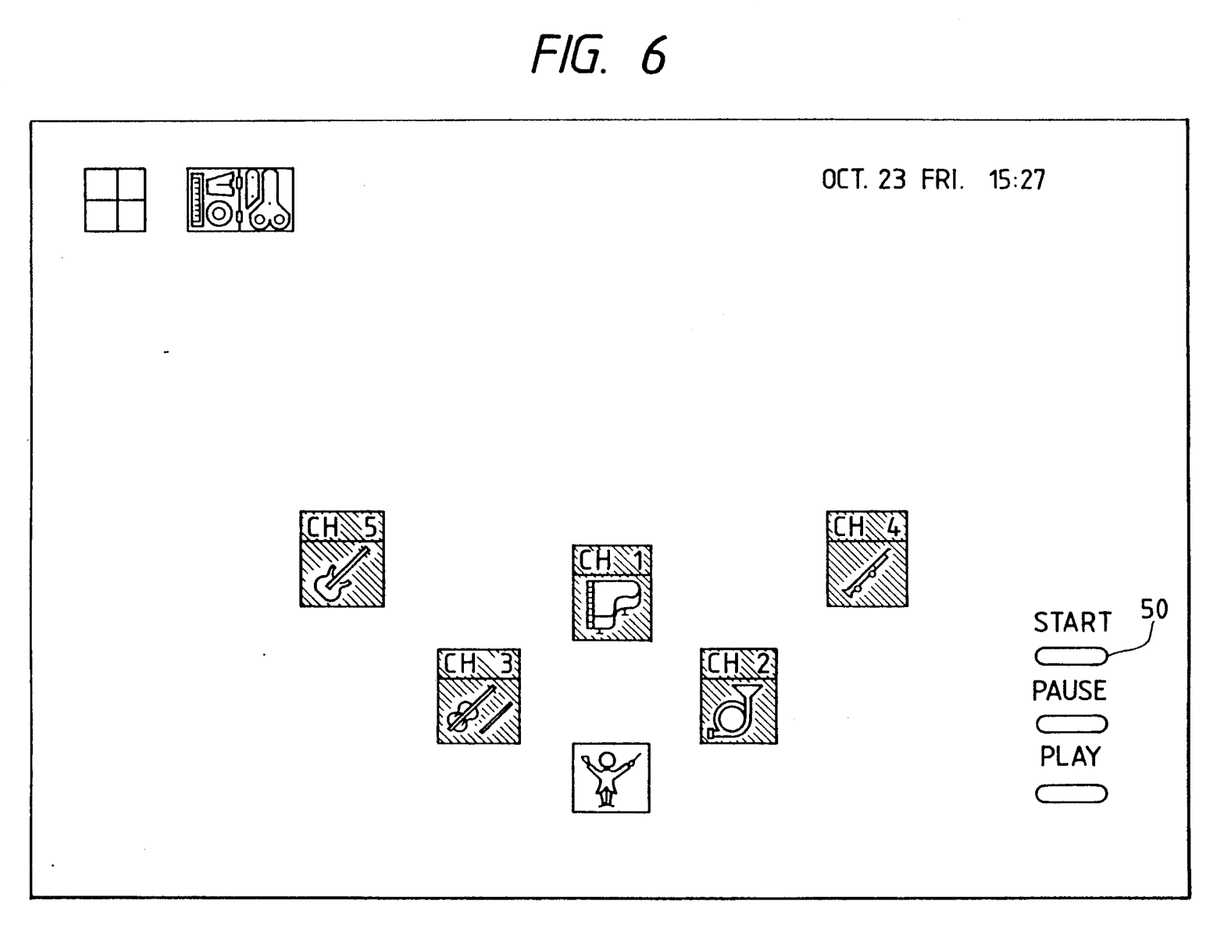
FIG. 6 shows an example of a display during the playing of music produced by the music editor.

FIG. 6 shows a display during the playing of music when a start icon 50 shown in FIG. 5 is touched.

Each display of the musical instrument and channel number is made dark or light to show the condition of the music being played.

Figure 7:
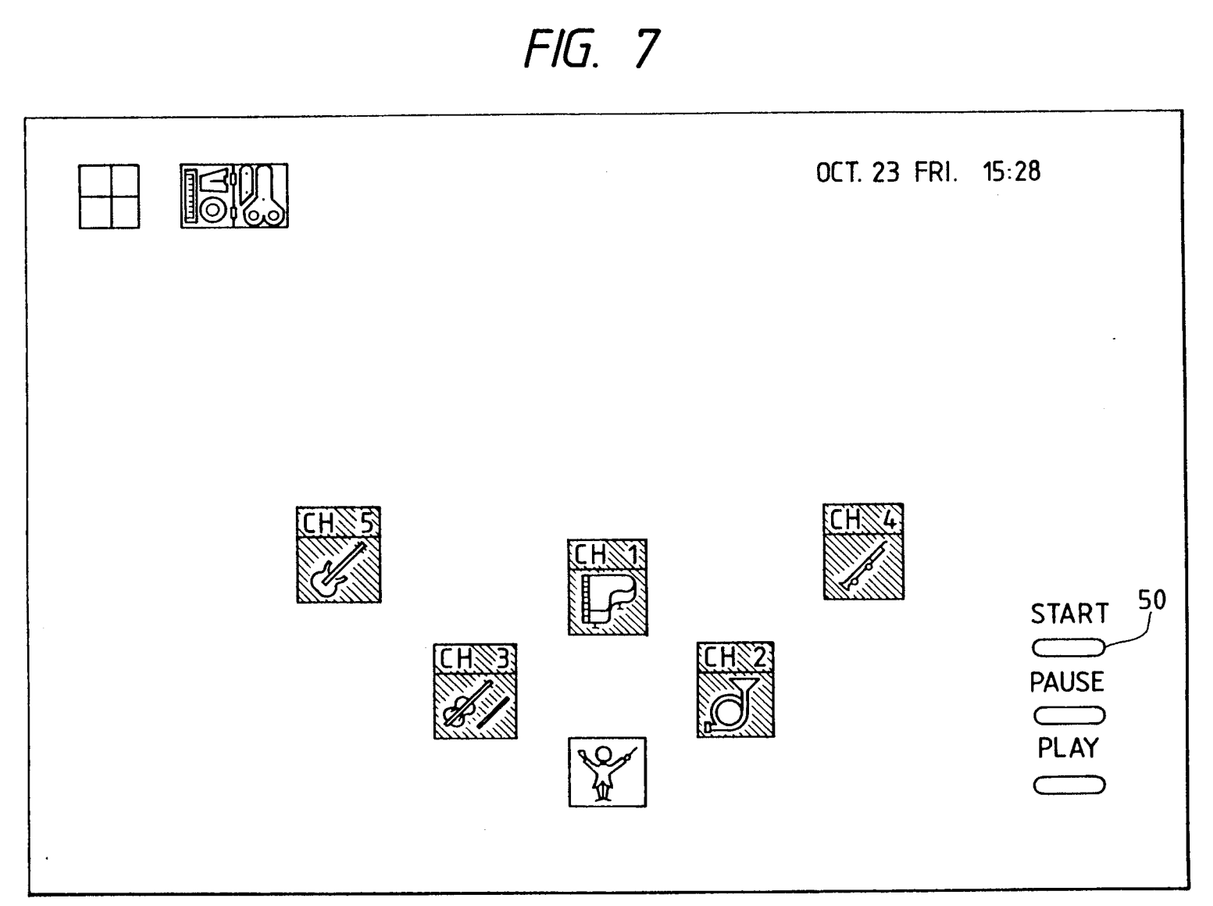
FIG. 7 shows an example of a display during playing music while stopping the playing by an oboe at channel 4.

FIG. 7 shows a display where the oboe at channel 4 is not used in playing music, with the channel number CH 4 only not being displayed dark FIGS. 8A to 8D are flow charts showing the outline of the music editor function. This program starts when the music editor icon on the main menu is touched.

Figure 8A:
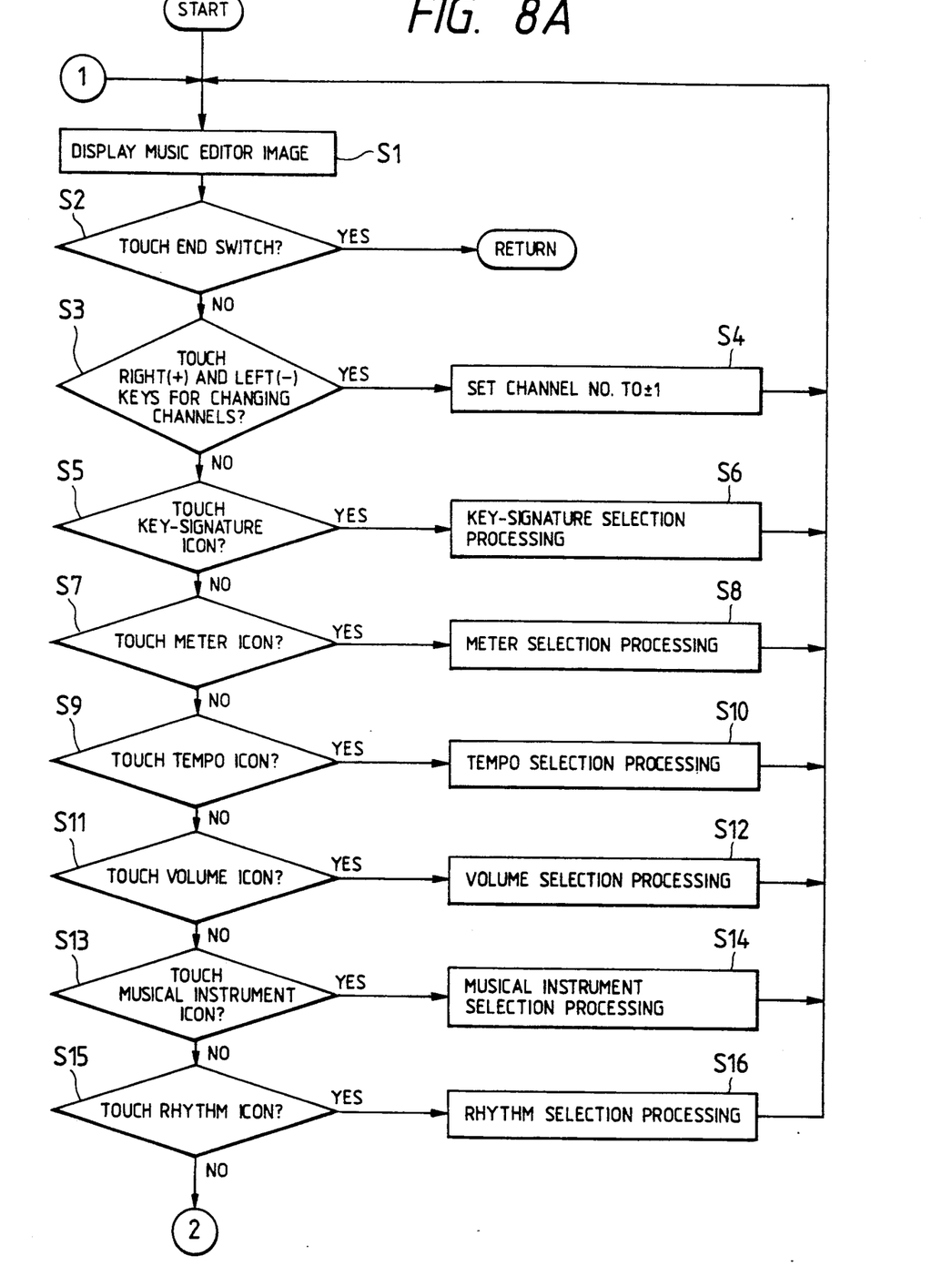
FIGS. 8A to 8D are flow charts showing briefly the procedure by the music editor.

At step S1, an editor display shown in FIG. 4 is given. At step S3 it is checked if one of the channel number change keys 45 is touched. If touched, at step S4 the channel number is incremented or decremented by 1 according to the touched key. At steps S5 and S6 if a key signature icon is touched, the touched key signature is selected and stored together with the musical note information. At steps S7 and S8, a time is set with a time icon, and at steps S9 and S10 a tempo is set with a tempo icon.

At steps S11 and S12 the volume of a musical tone is set with a volume icon. At steps S13 and S14 the musical instrument type is set with a musical instrument icon 47. At steps S15 and S16, the rhythm is set.

At steps S17 and S18, when one of the octave setting keys 46 is touched, the octave number is incremented or decremented by 1 according to the touched key. At steps S19 and S20 a tone time icon is touched to select a note such as a crotchet, quaver or the like. At step S21 if the keyboard 44 is touched, the flow advances to step S22 whereat tone information corresponding to the touched key position is inputted.

Figure 8B:
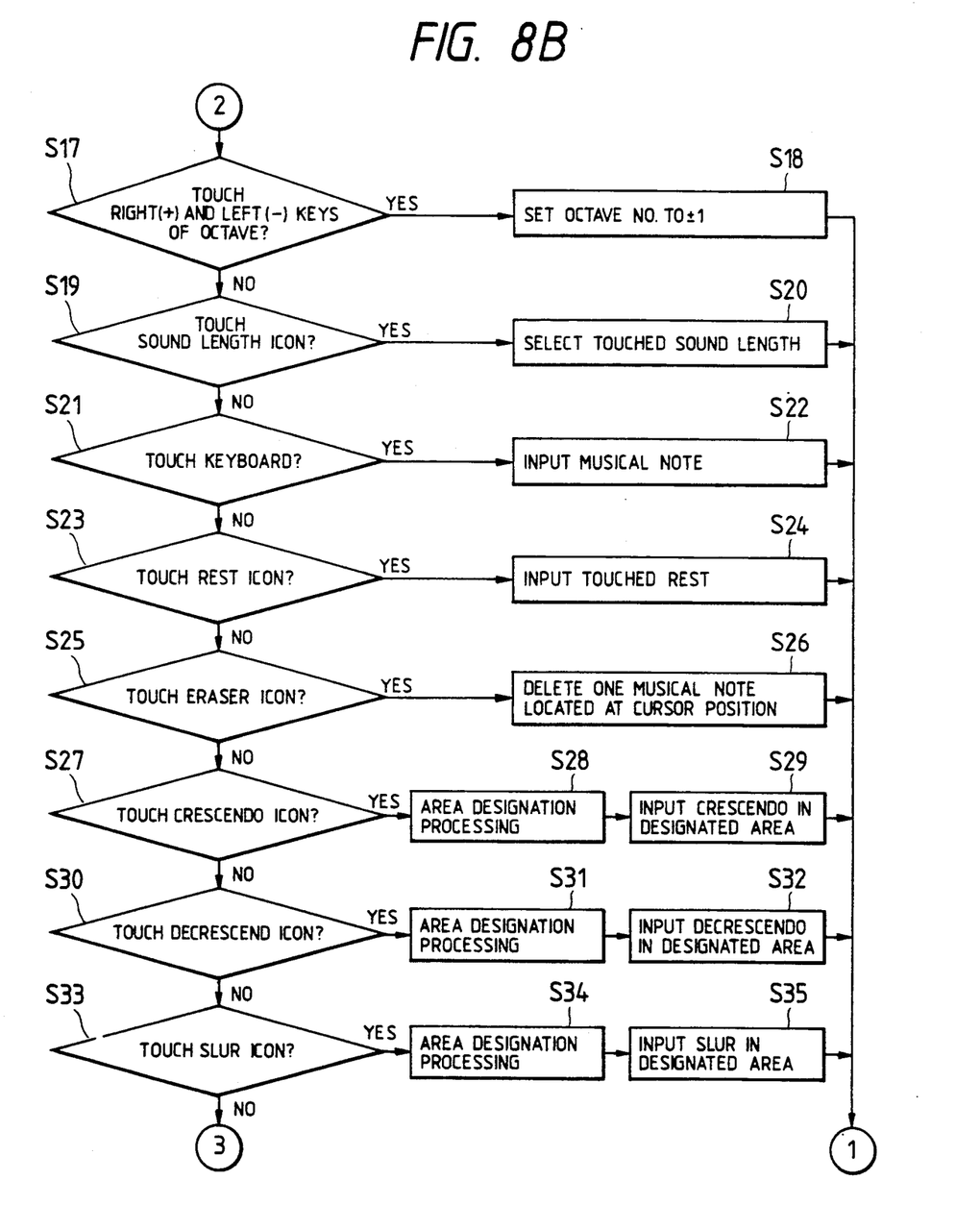

At steps S23 and S24, when a rest icon is touched, the touched rest is inputted. At steps S25 and S26, when an eraser icon is touched, a note on the musical score indicated by a cursor 48 is erased. At steps S27 and S35 it is possible to compose music as desired using the icons such as those crescendos, decrescendos, slurs and the like.

When a play icon is touched at step S36, a display as shown in FIG. 5 is obtained at step S37. In this case, if the musical instrument icon is touched at step S38, it is designated at step S39 if a channel play is to be executed or not, with the result that the musical instrument and channel number concerned are displayed dark. If the start switch 50 is touched at step S40, playing music starts at step S41, or restarts after interruption. Interruption of playing music is effected at steps S44 and S45, whereas the stopping of the playing of music is effected at steps S44 and S45.

Figure 8C:
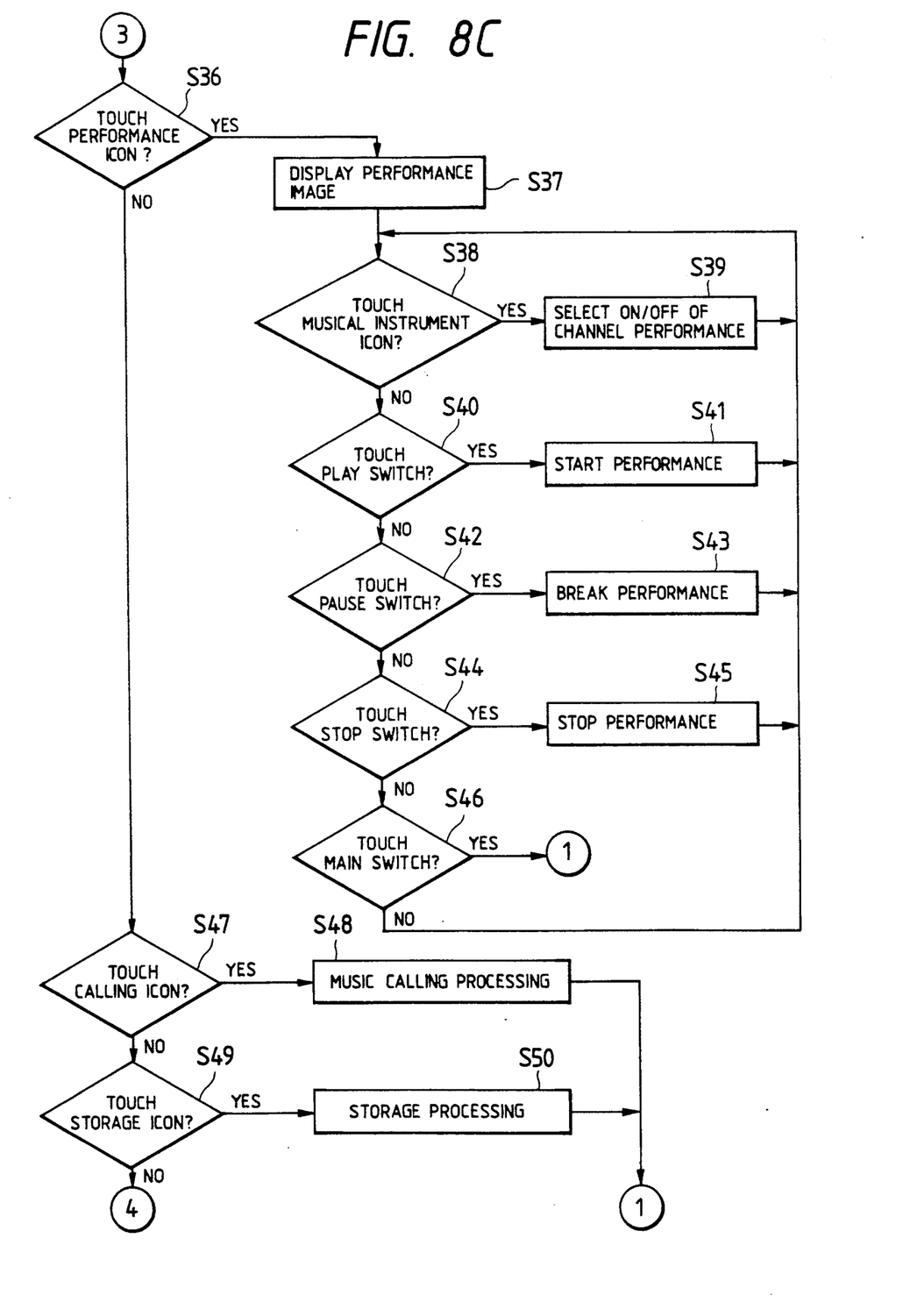

When an editor screen call icon 48 is touched at step S47, an image of the folder 11 is displayed at step S48 so that the user touches a desired data sheet to read it. The read-out music data are stored in the music data area 81 in the RAM. When the storage icon 43 is touched at step S49, an image of the holder 11 is displayed at step S50 so that the user touches a desired data sheet to store it therein.

Figure 8D:
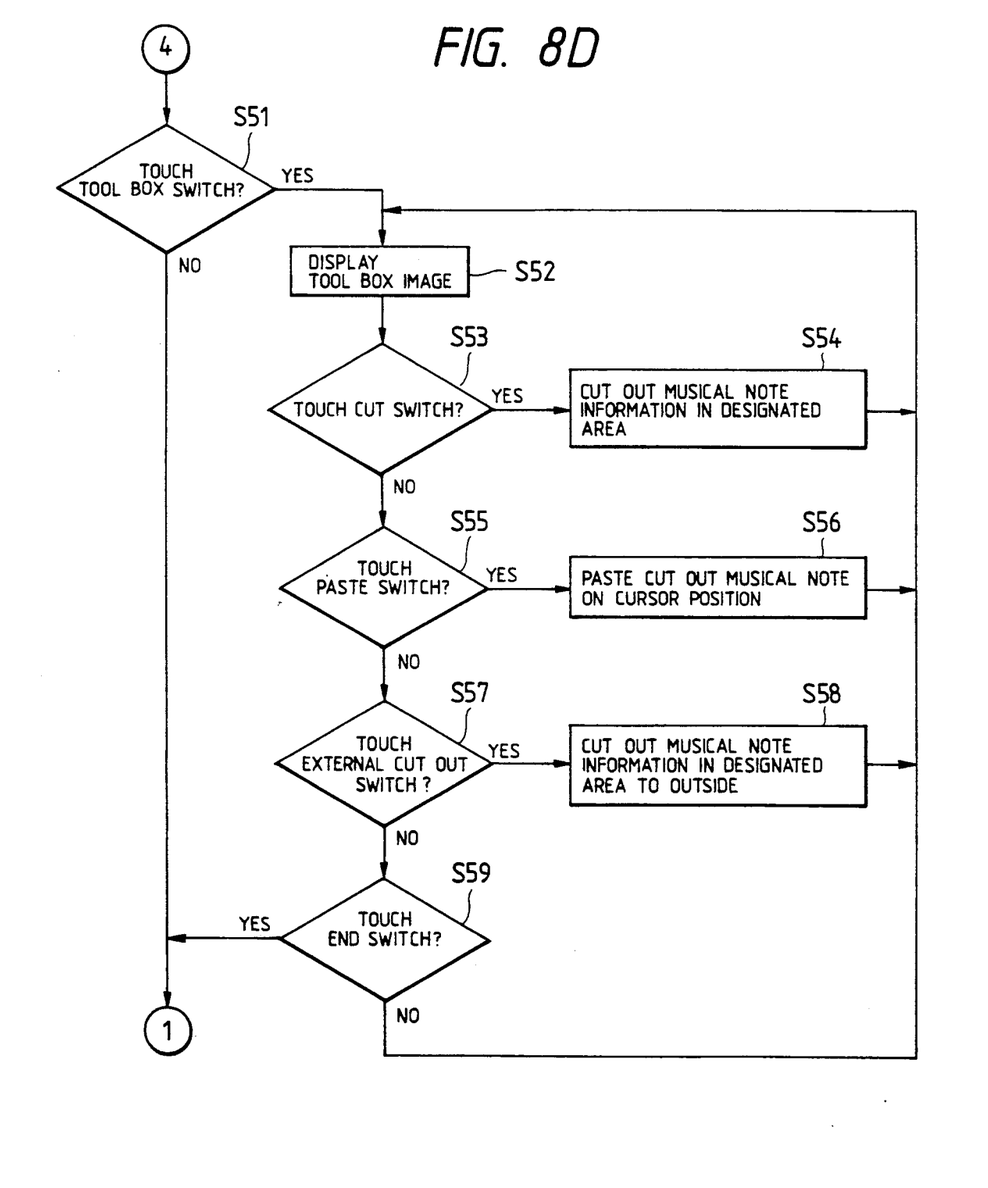

Step S51 and the following steps illustrate the flow chart for performing the tool box function. This tool box function can be read and executed for other functions when the tool box icon is touched.

If the icon 41 or 42 is touched at step S51, a tool box is displayed at step S52. If a block-pick-up icon is touched, the flow advances to step S54 whereat the musical tone information designated is block-picked up. If an attachment icon is touched at step S55, the flow advances to step S56 whereat the already block-picked-up musical tone information is attached (stored) at from the cursor 48.

It is checked at step S57 if an external block-pick-up switch is touched. If the external block-pick-up is designated, the flow advances to step S58 whereat the musical tone information within the designated block is block picked-up to the external. The block-picked-up musical information is stored in the work area of the memory so that the information can be read and attached to the tool box function, and used for example as a telephone holding sound in the telephone function. The tool box function terminates when an end icon is touched.

As seen from the foregoing description of the embodiment, the information processing apparatus has a plurality of functions which can be selectively executed as desired. For instance, music data produced with the music editor function can be used with other functions such as a telephone function, an alarm function and the like.

We claim:

1. An information processing apparatus comprising:
    means for displaying on a screen a staff notation, a keyboard, tone time information to be inputted, and symbols corresponding to musical information;
    means for producing musical information by designating a key of the keyboard and a portion of the tone time information displayed on said display means;
    means for storing the musical information produced by said designating means in correspondence with a predetermined one of the symbols;
    means for generating an instruction for playing the musical information stored in said storage means;
    means for controlling said display means to display the predetermined symbol corresponding to the musical information stored in said storage means in response to the instruction generated by said instruction generating means; and
    means for generating a musical tone by designating the position of the symbol displayed on said display means and by reading from said storage means the musical information corresponding to the designated symbol.

2. An information processing apparatus according to claim 1, further comprising means for designating a type of musical instrument for said musical information stored in said storage means, wherein said controlling means controls the musical information to generate a musical tone of said designated musical instrument in accordance with the musical information stored in said storage means.

3. An information processing apparatus according to claim 1, wherein said control means controls said display means to display the tone time information by using a pattern of musical note and a rest.

4. An information processing apparatus according to claim 1, wherein said designated means comprises a transparent touch panel mounted in front of said screen of said display means, wherein the positions of said keyboard and tone time information displayed on said display means are touched to allow designation of the musical tone information and the tone time information.

5. An information processing apparatus according to claim 1, wherein said control means controls said display means to additionally display information for setting a time, tempo, rhythm and musical notation, and wherein said designation means can designate the time, tempo, rhythm and musical notation.

6. An information processing apparatus according to claim 1, further comprising means for designating an area from which said musical information stored in said storage means is outputted, wherein said controlling means reads said musical information within the designated area and generates a corresponding musical tone.

7. An information processing apparatus according to claim 1, further comprising means for printing out said musical information stored in said storage means in the form of musical score.

8. An information processing apparatus comprising:
    means for displaying on a screen a staff notation, a keyboard, and a plurality of musical notes and a rest;
    means for producing musical information by designating a key of the keyboard and one of the musical notes and rest;
    means for storing the musical information produced by said producing means;
    means for designating one of a variety of musical instruments by which the musical information stored in said first memory means is to be reproduced:
    means for storing symbols each corresponding to a different one of the musical instruments;
    means for generating an instruction for reproducing the musical information stored in said first memory means;

means for controlling said display means to display one of the symbols corresponding to the designated musical instrument stored in said symbol storage means in response to the instruction generated by said instruction generating means; and means for reproducing the musical information stored in said musical information storage means in a tone color of the musical instrument by designating the position of its corresponding symbol displayed on said display means.

9. An information processing apparatus according to claim 8, wherein said first designating means comprises a transparent touch panel mounted in front of said screen of said display means, wherein the positions of said keyboard, musical tone and rest displayed on said display means are touched to allow designation of the musical tone information and the tone time information.

10. An information processing apparatus according to claim 8, wherein said display means displays on said screen the information for setting a time, tempo, rhythm and musical tone, and said first designation means can designate the time, tempo, rhythm and musical tone.

11. An apparatus according to claim 1, wherein said control means controls said display means to display a musical note or rest on the staff notation in response to the key and the portion of tone time information designated by said designating means.

12. An apparatus according to claim 1, further comprising stop instruction means for instructing generation of the musical tone to be stopped by designating the position of one of the symbols displayed on the screen.

13. An apparatus according to claim 1, further comprising mean for executing a plurality of independent functions and for using the musical information produced by said designing means as information for executing the plurality of functions.

14. An apparatus according to claim 8, wherein said control means controls said display means to display a musical note or rest on the staff notation in response to a designation by said first designating means.

15. An apparatus according to claim 8, further comprising stop instruction means for instructing reproduction of the musical information to be stopped.

16. An apparatus according to claim 8, further comprising means for executing a plurality of independent functions and for using the musical information produced by said first designating means as information for executing the plurality of functions.

* * * * *

UNITED STATES PATENT AND TRADEMARK OFFICE
CERTIFICATE OF CORRECTION

PATENT NO. : 5,153,829
DATED : October 6, 1992
INVENTOR(S) : YOJI FURUYA, ET AL.

It is certified that error appears in the above-identified patent and that said Letters Patent is hereby corrected as shown below:

On the title page:

BETWEEN [22] AND [63]

Insert: --[30] FOREIGN APPLICATION PRIORITY DATA
Nov. 11, 1987 [JP] Japan ......... 62-283174--.

COLUMN 1

Line 40, "of such" should read --such as--.

COLUMN 5

Line 40, "at from" should read --at the position of--.

COLUMN 6

Line 67, "first memory" should read --musical information storage--.

COLUMN 8

Line 8, "mean" should read --means--.

Signed and Sealed this

Thirtieth Day of November, 1993

Attest:

BRUCE LEHMAN

Attesting Officer

Commissioner of Patents and Trademarks